United States Patent
Suk et al.

(10) Patent No.: US 12,555,249 B2
(45) Date of Patent: Feb. 17, 2026

(54) METHOD, SYSTEM, AND NON-TRANSITORY COMPUTER READABLE STORAGE MEDIUM FOR SUPPORTING VIRTUAL GOLF SIMULATION

(71) Applicant: CREATZ INC., Suwon-si (KR)

(72) Inventors: Yong Ho Suk, Seongnam-si (KR); Jey Ho Suk, Seoul (KR)

(73) Assignee: CREATZ INC., Suwon-si (KR)

( * ) Notice: Subject to any disclaimer, the term of this patent is extended or adjusted under 35 U.S.C. 154(b) by 352 days.

(21) Appl. No.: 18/034,456

(22) PCT Filed: Nov. 1, 2021

(86) PCT No.: PCT/KR2021/015625
§ 371 (c)(1),
(2) Date: May 2, 2023

(87) PCT Pub. No.: WO2022/092983
PCT Pub. Date: May 5, 2022

(65) Prior Publication Data
US 2023/0377173 A1    Nov. 23, 2023

(30) Foreign Application Priority Data
Oct. 30, 2020 (KR) .......... 10-2020-0143836

(51) Int. Cl.
*G06T 7/246* (2017.01)
*A63B 24/00* (2006.01)
(Continued)

(52) U.S. Cl.
CPC .......... *G06T 7/248* (2017.01); *A63B 24/0021* (2013.01); *A63B 71/0622* (2013.01);
(Continued)

(58) Field of Classification Search
CPC ......... G06T 7/248; G06T 7/74; G06T 19/003; G06T 2207/30224; G06T 2207/30241;
(Continued)

(56) References Cited

U.S. PATENT DOCUMENTS

2006/0063574 A1* 3/2006 Richardson ........ A63B 24/0021
463/2
2009/0122058 A1* 5/2009 Tschesnok .............. G06T 7/579
345/420
(Continued)

FOREIGN PATENT DOCUMENTS

JP      2008171280 A     7/2008
KR      101048090 B1     7/2011
(Continued)

*Primary Examiner* — Chineyere Wills-Burns
*Assistant Examiner* — Aaron Timothy Bonansinga
(74) *Attorney, Agent, or Firm* — Dinsmore & Shohl LLP; Yongsok Choi, Esq.

(57) ABSTRACT

A method for supporting a virtual golf simulation is provided. The method includes the steps of: determining, with reference to information on a first reference pattern specified in an image photographed by a first photographing module positioned to photograph a moving subject and information on a second reference pattern specified in an image photographed by a second photographing module positioned to photograph a display area where information associated with the subject is displayed, a positional relationship between coordinates specified in the first photographing module and coordinates specified in the display area; and determining information on a trajectory of the subject in the display area with reference to the positional relationship.

17 Claims, 7 Drawing Sheets

(51) Int. Cl.
*A63B 71/06* (2006.01)
*A63B 102/32* (2015.01)
*G06T 7/73* (2017.01)
*G06T 19/00* (2011.01)

(52) U.S. Cl.
CPC .............. *G06T 7/74* (2017.01); *G06T 19/003* (2013.01); *A63B 2024/0034* (2013.01); *A63B 2071/0638* (2013.01); *A63B 2102/32* (2015.10); *A63B 2220/05* (2013.01); *A63B 2220/806* (2013.01); *G06T 2207/30224* (2013.01); *G06T 2207/30241* (2013.01); *G06T 2207/30244* (2013.01)

(58) Field of Classification Search
CPC . G06T 2207/30244; G06T 2207/10048; G06T 7/292; G06T 2207/10021; G06T 7/246; G06T 2207/30221; G06T 7/20; G06T 7/70; A63B 24/0021; A63B 71/0622; A63B 2024/0034; A63B 2071/0638; A63B 2102/32; A63B 2220/05; A63B 2220/806; A63B 2024/0028; A63B 69/3623; A63B 2071/0694; A63B 63/00; A63B 2225/02; A63B 69/3652; A63B 69/36
USPC .......................................................... 382/103
See application file for complete search history.

(56) References Cited

U.S. PATENT DOCUMENTS

| | | | | |
|---|---|---|---|---|
| 2014/0004967 | A1* | 1/2014 | Jang | G09B 9/00 473/409 |
| 2014/0226869 | A1* | 8/2014 | Suk | A63B 24/0021 382/107 |
| 2017/0004358 | A1* | 1/2017 | Bose | G06Q 10/0639 |
| 2017/0124928 | A1* | 5/2017 | Edwin | G01B 11/22 |
| 2019/0099655 | A1* | 4/2019 | Park | A63B 71/06 |
| 2019/0134506 | A1* | 5/2019 | Gupta | G09B 19/0038 |
| 2019/0378303 | A1* | 12/2019 | Shaw | G06T 7/97 |
| 2020/0174560 | A1 | 6/2020 | Park | |
| 2020/0364900 | A1* | 11/2020 | Bradski | H04N 23/80 |
| 2020/0409458 | A1* | 12/2020 | Smithwick | A61B 3/103 |
| 2022/0051420 | A1* | 2/2022 | Forsgren | G06T 7/292 |

FOREIGN PATENT DOCUMENTS

| | | |
|---|---|---|
| KR | 1020130032858 A | 4/2013 |
| KR | 1020140086938 A | 7/2014 |
| KR | 101430723 B1 | 8/2014 |
| KR | 101496441 B1 | 2/2015 |
| KR | 101639065 B1 | 7/2016 |
| KR | 1020200067641 A | 6/2020 |
| WO | 2011013625 A1 | 2/2011 |

* cited by examiner

FIG. 7

METHOD, SYSTEM, AND NON-TRANSITORY COMPUTER READABLE STORAGE MEDIUM FOR SUPPORTING VIRTUAL GOLF SIMULATION

CROSS-REFERENCE TO RELATED APPLICATION(S)

This application is a national phase of Patent Cooperation Treaty (PCT) International Application No. PCT/KR2021/015625 filed on Nov. 1, 2021, which claims priority to Korean Patent Application No. 10-2020-0143836 filed on Oct. 30, 2020. The entire contents of PCT International Application No. PCT/KR2021/015625 and Korean Patent Application No. 10-2020-0143836 are hereby incorporated by reference.

FIELD OF THE INVENTION

The present invention relates to a method, system, and non-transitory computer-readable recording medium for supporting a virtual golf simulation.

BACKGROUND

Virtual golf systems are widely spreading which allow golfers to virtually play golf at low cost in downtown areas and the like. The basic concept of such virtual golf systems is to, when a golf ball is hit by a golfer, perform a simulation of the shot and display a result of the simulation on a screen.

However, according to the techniques introduced so far as well as the above-described conventional technique, when a golfer hits a golf ball, a trajectory of the ball in the real world shown to the golfer does not match a trajectory of the ball in an area where information associated with the ball is displayed through a simulation, resulting in a problem such as lack of sense of reality in terms of user experience.

In this connection, the inventor(s) present a novel and inventive technique capable of synchronizing a trajectory in which a golf ball moves in the real world with a trajectory in which the golf ball moves in an area where information associated with the golf ball is displayed through a simulation.

SUMMARY OF THE INVENTION

One object of the present invention is to solve all the above-described problems in the prior art.

Another object of the invention is to allow golfers who experience virtual golf to increase their sense of reality, sense of presence, and immersion.

Yet another object of the invention is to, when a golfer hits a golf ball, synchronize a trajectory in which the ball actually moves with a trajectory in which the ball moves in an area where information associated with the ball is displayed through a simulation.

The representative configurations of the invention to achieve the above objects are described below.

According to one aspect of the invention, there is provided a method for supporting a virtual golf simulation, the method comprising the steps of: determining, with reference to information on a first reference pattern specified in an image photographed by a first photographing module positioned to photograph a moving subject and information on a second reference pattern specified in an image photographed by a second photographing module positioned to photograph a display area where information associated with the subject is displayed, a positional relationship between coordinates specified in the first photographing module and coordinates specified in the display area; and determining information on a trajectory of the subject in the display area with reference to the positional relationship.

According to another aspect of the invention, there is provided a system for supporting a virtual golf simulation, the system comprising: a positional relationship determination unit configured to determine, with reference to information on a first reference pattern specified in an image photographed by a first photographing module positioned to photograph a moving subject and information on a second reference pattern specified in an image photographed by a second photographing module positioned to photograph a display area where information associated with the subject is displayed, a positional relationship between coordinates specified in the first photographing module and coordinates specified in the display area; and a trajectory information determination unit configured to determine information on a trajectory of the subject in the display area with reference to the positional relationship.

In addition, there are further provided other methods and systems to implement the invention, as well as non-transitory computer-readable recording media having stored thereon computer programs for executing the methods.

According to the invention, it is possible to allow golfers who experience virtual golf to increase their sense of reality, sense of presence, and immersion.

According to the invention, it is possible to, when a golfer hits a golf ball, synchronize a trajectory in which the ball actually moves with a trajectory in which the ball moves in an area where information associated with the ball is displayed through a simulation.

DETAILED DESCRIPTION

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the invention will be described in detail with reference to the accompanying drawings to enable those skilled in the art to easily implement the invention.

Configuration of the Entire System

Figure 1:
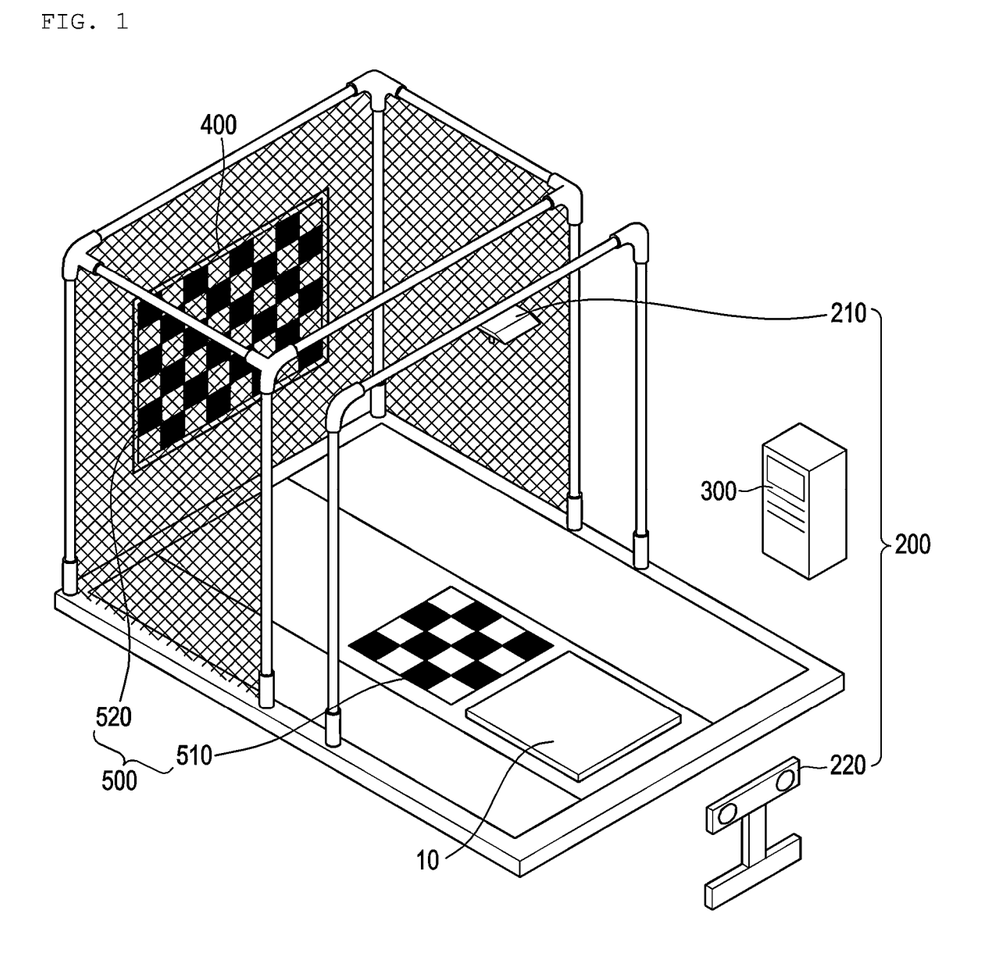
FIG. 1 schematically shows the entire configuration of a virtual golf simulation system according to one embodiment of the invention.

FIG. 1 schematically shows the entire configuration of a virtual golf simulation system according to one embodiment of the invention.

As shown in FIG. 1, the virtual golf simulation system 200 may comprise a shot unit 10, a photographing unit 200, a simulator 300, a display unit 400, and a reference pattern unit 500.

First, the shot unit 10 according to one embodiment of the invention may be a part on which a golfer steps up to place and hit a golf ball when using the virtual golf simulation system. The shot unit 10 may include a known swing plate, the tilt angle of which may be adjusted. It is noted that when the invention is applied to other kinds of virtual sport simulation systems, those skilled in the art may modify the configuration of the shot unit 10 (and the configurations of other components associated therewith, if necessary) to suit to the characteristics of the corresponding sports.

Next, the photographing unit 200 according to one embodiment of the invention may comprise a first photographing module 210 positioned to photograph a subject and a second photographing module 220 positioned to photograph a display area where information associated with the subject is displayed (specifically, a predetermined area of the display unit 400). For example, the photographing modules 210 and 220 of the photographing unit 200 may comprise at least one camera (more specifically, a high-speed camera, an infrared camera, a stereo camera, and the like).

For example, the first photographing module 210 may be positioned in a location to look down at a subject (e.g., a golf ball or a golf club) as shown in FIG. 1 (e.g., may be positioned and fixed in a location to face a ground surface), and the second photographing module 220 may be positioned in a location to view the display unit 400 from the front or side. Meanwhile, it is noted that the locations of the photographing modules 210 and 220 according to the invention are not necessarily limited only to the above embodiment, and may be diversely changed as long as the objects of the invention may be achieved. Further, the photographing modules 210 and 220 according to one embodiment of the invention may function similarly to a stereo camera by rapidly moving one camera from side to side while photographing, or may function similarly to a high-speed camera by sequentially photographing using at least two cameras having different photographing speeds.

Next, the simulator 300 according to one embodiment of the invention may communicate with the photographing unit 200, the display unit 400, or the reference pattern unit 500, and may include a dedicated processor (not shown) for the virtual golf simulation system. The dedicated processor may be provided with a memory means and may have capabilities for numerical operations and graphics processing. The simulator 300 may be partially similar to a conventional apparatus for performing a virtual golf simulation.

Specifically, the simulator 300 may function to: acquire images photographed by the first photographing module 210 positioned to photograph a subject and the second photographing module 220 positioned to photograph a display area where information associated with the subject is displayed, respectively; determine, with reference to information on a first reference pattern specified in the image photographed by the first photographing module 210 and information on a second reference pattern specified in the image photographed by the second photographing module 220, a positional relationship between coordinates specified in the first photographing module 210 and coordinates specified in the display area; and determine information on a trajectory of the subject in the display area with reference to the positional relationship.

The configuration of the simulator 300 will be further described below with reference to FIG. 4.

Next, the display unit 400 according to one embodiment of the invention may function to display the information associated with the subject (e.g., direction of movement, velocity, acceleration, angular velocity, position, trajectory, or related simulation figures or graphical elements of the golf ball) of the simulator 300. The display unit 400 may display images via a known display means and, for example, may comprise a screen, which absorbs the impact of the hit golf ball and does not emit light directly, and a projector to output images on the screen.

Lastly, the reference pattern unit 500 may be positioned to face the photographing modules 210 and 220 of the photographing unit 200 to provide predetermined patterns. Specifically, the reference pattern unit 500 may comprise a first reference pattern unit 510 positioned to face the first photographing module 210 of the photographing unit 200 to provide a predetermined pattern (i.e., a first reference pattern), and a second reference pattern unit 520 positioned to face the second photographing module 220 of the photographing unit 200 to provide a predetermined pattern (i.e., a second reference pattern). For example, the reference pattern unit 500 may be printed plates or programmed electronic displays for displaying predetermined patterns such as checkerboard patterns or square grid patterns for camera calibration. However, the manner of providing the reference pattern unit 500 and the pattern shapes of the reference pattern unit 500 according to the invention are not necessarily limited only to the above embodiment, and may be diversely changed as long as the objects of the invention may be achieved. Further, it is noted that according to one embodiment of the invention, the appearance of the ground surface or other background may be employed in place of the reference pattern unit 500.

For example, the first reference pattern unit 510 may be positioned such that a predetermined pattern (i.e., a first reference pattern) is printed, projected, or attached onto the ground surface to face the first photographing module 210, and the second reference pattern unit 520 may be positioned such that a predetermined pattern (i.e., a second reference pattern) is printed, projected, or attached onto the display area to face the second photographing module 220. The first and second reference patterns may be displayed temporarily (e.g., upon initial execution of the virtual golf simulation system, or upon request from the virtual golf simulation system), or may be displayed only for a predetermined period of time.

Figure 2:
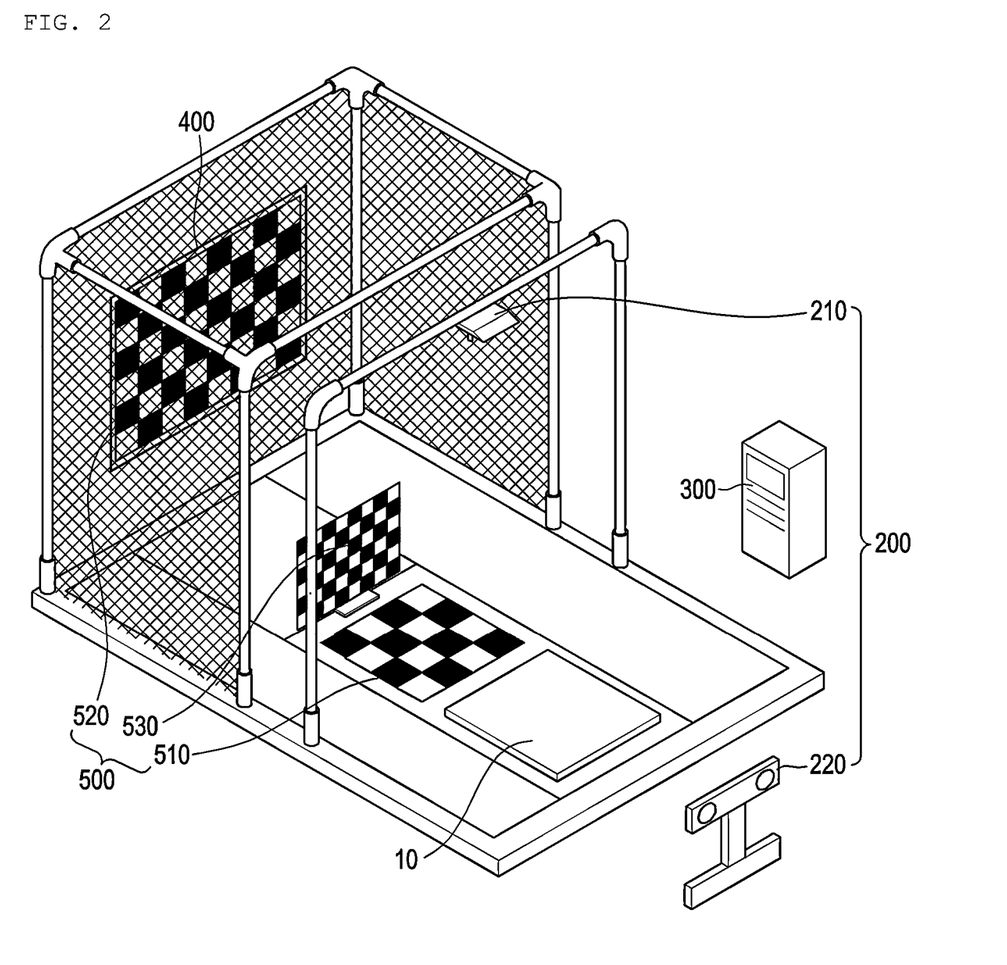
FIG. 2 illustratively shows another configuration of the virtual golf simulation system according to one embodiment of the invention.

Meanwhile, referring to FIG. 2, the reference pattern unit 500 according to one embodiment of the invention may further comprise a third reference pattern unit 530 positioned between the second photographing module 220 and the display area to face the second photographing module 220 to provide a predetermined pattern (i.e., a third reference pattern). Like the first and second reference patterns discussed above, the third reference pattern may be displayed temporarily (e.g., upon initial execution of the virtual golf simulation system, or upon request from the virtual golf simulation system), or may be displayed only for a predetermined period of time.

More specifically, the third reference pattern unit 530 may be formed to rotate about a predetermined axis of rotation, and may be positioned to rotate about the axis of rotation and face the second photographing module 220 only while providing the third reference pattern.

Figure 3:
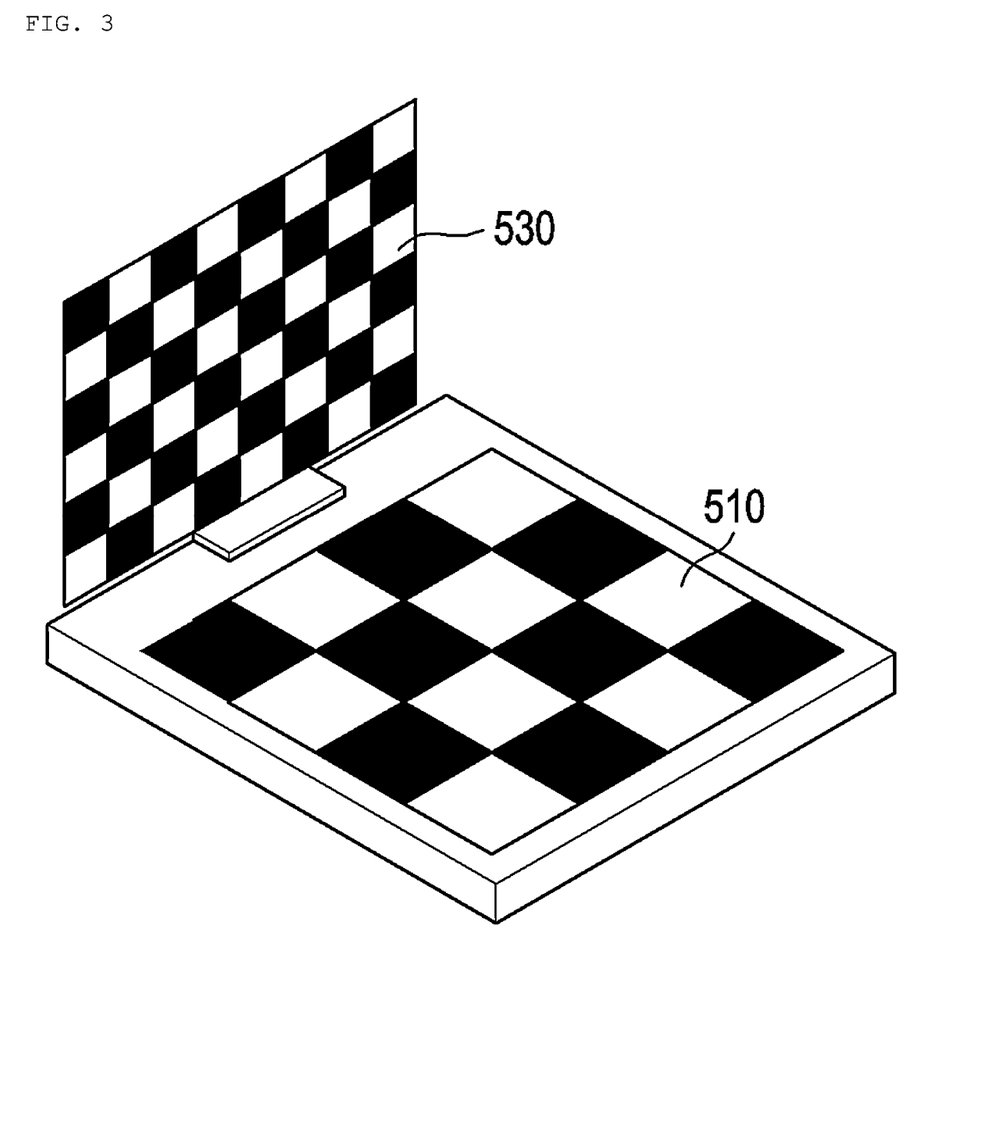
FIG. 3 illustratively shows another configuration of the virtual golf simulation system according to one embodiment of the invention.

Meanwhile, referring to FIG. 3, the first reference pattern unit 510 and the third reference pattern unit 530 may be configured to be included in one assembly (e.g., a utensil).

For example, the first reference pattern unit 510 and the third reference pattern unit 530 may be formed at different angles in one assembly, and the first reference pattern and the third reference pattern may be provided by the pattern units 510 and 530, respectively. By utilizing such an integrated assembly, a relative distance between the first and third reference patterns may be predetermined.

Configuration of the Simulator

Hereinafter, the internal configuration of the simulator 300 according to one embodiment of the invention and the functions of the respective components thereof will be discussed.

Figure 4:
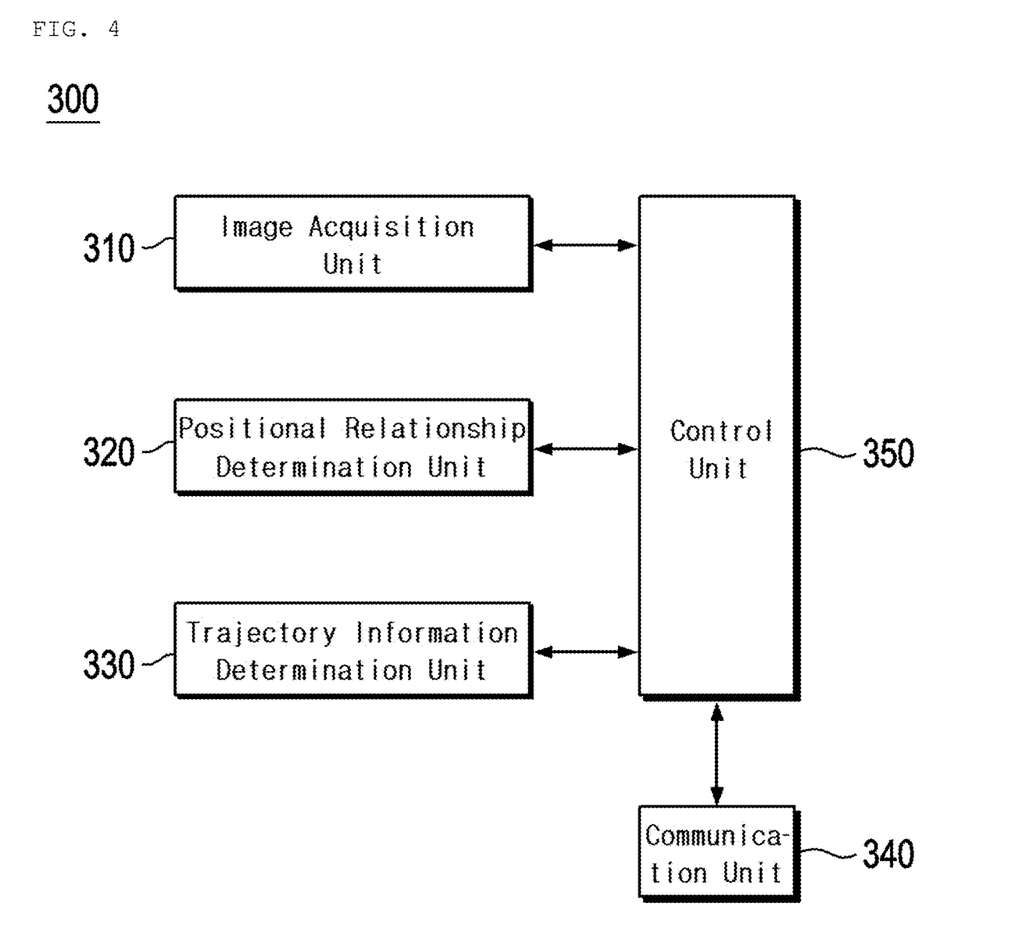
FIG. 4 specifically shows the internal configuration of a simulator according to one embodiment of the invention.

As shown in FIG. 4, the simulator 300 may comprise an image acquisition unit 310, a positional relationship determination unit 320, a trajectory information determination unit 330, a communication unit 340, and a control unit 350. According to one embodiment of the invention, at least some of the image acquisition unit 310, the positional relationship determination unit 320, the trajectory information determination unit 330, the communication unit 340, and the control unit 350 may be program modules that communicate with an external system (not shown). The program modules may be included in the simulator 300 in the form of operating systems, application program modules, or other program modules, while they may be physically stored in a variety of commonly known storage devices. Further, the program modules may also be stored in a remote storage device that may communicate with the simulator 300. Meanwhile, such program modules may include, but not limited to, routines, subroutines, programs, objects, components, and data structures for performing specific tasks or executing specific abstract data types according to the invention as will be described below.

First, the image acquisition unit 310 according to one embodiment of the invention may function to acquire images photographed by the first photographing module 210 positioned to photograph a subject and the second photographing module 220 positioned to photograph a display area where information associated with the subject is displayed, respectively.

Next, the positional relationship determination unit 320 according to one embodiment of the invention may function to determine, with reference to information on a first reference pattern specified in the image photographed by the first photographing module 210 and information on a second reference pattern specified in the image photographed by the second photographing module 220, a positional relationship between coordinates specified in the first photographing module 210 and coordinates specified in the display area. The information on the reference patterns according to one embodiment of the invention may encompass information on positions, positioning relationships, coordinates (e.g., coordinates defined in a reference spatial system defined by the photographing modules 210 and 220 or the virtual golf simulation system), and the like of specific shapes or areas appearing in the respective patterns.

For example, the positional relationship determination unit 320 may specify positioning information of the first photographing module 210 on the basis of information on a first reference pattern specified in the image photographed by the first photographing module 210, and specify positioning information of the second photographing module 220 on the basis of information on a third reference pattern specified in the image photographed by the second photographing module 220 (specifically, a reference pattern positioned between the second photographing module 220 and the display area to face the second photographing module 220). More specifically, according to one embodiment of the invention, the positional relationship determination unit 320 may determine positions, directions, and orientations of the first photographing module 210 and the second photographing module 220 in a reference spatial coordinate system associated with the first photographing module 210 or the virtual golf simulation system (or the simulator 300), respectively, on the basis of coordinates (or a position) of each pattern within the first reference pattern specified in the image photographed by the first photographing module 210 and coordinates (or a position) of each pattern within the third reference pattern specified in the image photographed by the second photographing module 220. To this end, a photographing module parameter calculation algorithm such as a direct linear transformation (DLT) algorithm, a Zhang algorithm, a Tsai algorithm, and a Selby algorithm may be employed.

Meanwhile, in order to specify the positioning information of the first photographing module 210 and the second photographing module 220 as above, it is possible to employ known techniques related to camera resectioning or camera calibration (e.g., the technique disclosed in the Wikipedia webpage on the camera resectioning ("https://en.wikipedia.org/wiki/camera_resectioning"), which is deemed to be incorporated herein in its entirety). However, it is noted that the manner of specifying the positioning information of the photographing modules 210 and 220 according to the invention is not limited to the foregoing, and may be diversely changed as long as the objects of the invention may be achieved.

Meanwhile, when the second photographing module 220 is positioned in a predetermined location, or when the location of the second photographing module 220 may be specified by the first photographing module 210, the positional relationship determination unit 320 may directly acquire the positioning information of the second photographing module 220 without employing the information on the third reference pattern as above.

Further, the positional relationship determination unit 320 may specify a positional relationship between coordinates specified in the second photographing module 220 and coordinates specified in the display area, with reference to information on a second reference pattern specified in the image photographed by the second photographing module 220 (specifically, a reference pattern positioned in the display area).

For example, the positional relationship determination unit 320 may analyze the image photographed by the second photographing module 220 (e.g., a stereo image) with respect to the second reference pattern positioned in the display area, thereby determining three-dimensional coordinates of each pattern within the second reference pattern specified with respect to the second photographing module 220, and may analyze a correspondence relationship between the three-dimensional coordinates of each pattern within the second reference pattern specified with respect to the second photographing module 220 and two-dimensional coordinates of each pattern within the second reference pattern specified with respect to the display area, thereby specifying a positional relationship between the coordinates specified in the second photographing module 220 and the coordinates specified in the display area.

Meanwhile, according to one embodiment of the invention, in order to acquire three-dimensional coordinates from the image photographed by the second photographing module 220 as above, it is possible to employ a stereo vision (e.g., structured light vision (SLV), active stereo vision (ASV), or structured-light stereo (SLS)) method (e.g., the techniques disclosed in the Wikipedia webpage on the stereo vision ("https://en.wikipedia.org/wiki/computer_stereo_vision") and Korean Laid-Open Patent Publication No. 10-2014-0086938, which are deemed to be incorporated herein in their entirety). However, it is noted that the manner of specifying the coordinates according to the invention is not limited to the foregoing, and may be diversely changed as long as the objects of the invention may be achieved.

Further, the positional relationship determination unit 320 may determine a positional relationship between coordinates specified in the first photographing module 210 and the coordinates specified in the display area, with reference to a positional relationship between the first photographing module 210 and the second photographing module 220 (or between the coordinates specified in the first photographing module 210 and the coordinates specified in the second photographing module 220), which may be specified by comparing and analyzing the positioning information of the first photographing module 210 and the positioning information of the second photographing module 220 as discussed above.

In addition, the positional relationship determination unit 320 may dynamically determine an attribute of the second reference pattern provided in the display area with reference to information on a resolution of the display area.

For example, the positional relationship determination unit 320 may adaptively adjust at least one of a size, shape, and number of the second reference pattern on the basis of information on a resolution determined with respect to the display area.

Next, the trajectory information determination unit 330 according to one embodiment of the invention may function to determine information on a trajectory of the subject in the display area with reference to the positional relationship determined by the positional relationship determination unit 320.

For example, the trajectory information determination unit 330 may determine two-dimensional coordinates in the display area corresponding to three-dimensional coordinates of the subject photographed by the first photographing module 210, on the basis of the positional relationship between the coordinates specified in the first photographing module 210 and the coordinates specified in the display area, and may determine information on a trajectory of the subject in the display area, as well as information on physical quantities (e.g., a direction of movement, position, and velocity) of the subject, with reference to the determined two-dimensional coordinates.

Next, the communication unit 340 according to one embodiment of the invention may function to enable data transmission/reception from/to the image acquisition unit 310, the positional relationship determination unit 320, and the trajectory information determination unit 330.

Lastly, the control unit 350 according to one embodiment of the invention may function to control data flow among the image acquisition unit 310, the positional relationship determination unit 320, the trajectory information determination unit 330, and the communication unit 340. That is, the control unit 350 may control data flow into/out of the simulator 300 or data flow among the respective components of the simulator 300, such that the image acquisition unit 310, the positional relationship determination unit 320, the trajectory information determination unit 330, and the communication unit 340 may carry out their particular functions, respectively.

Figure 5:
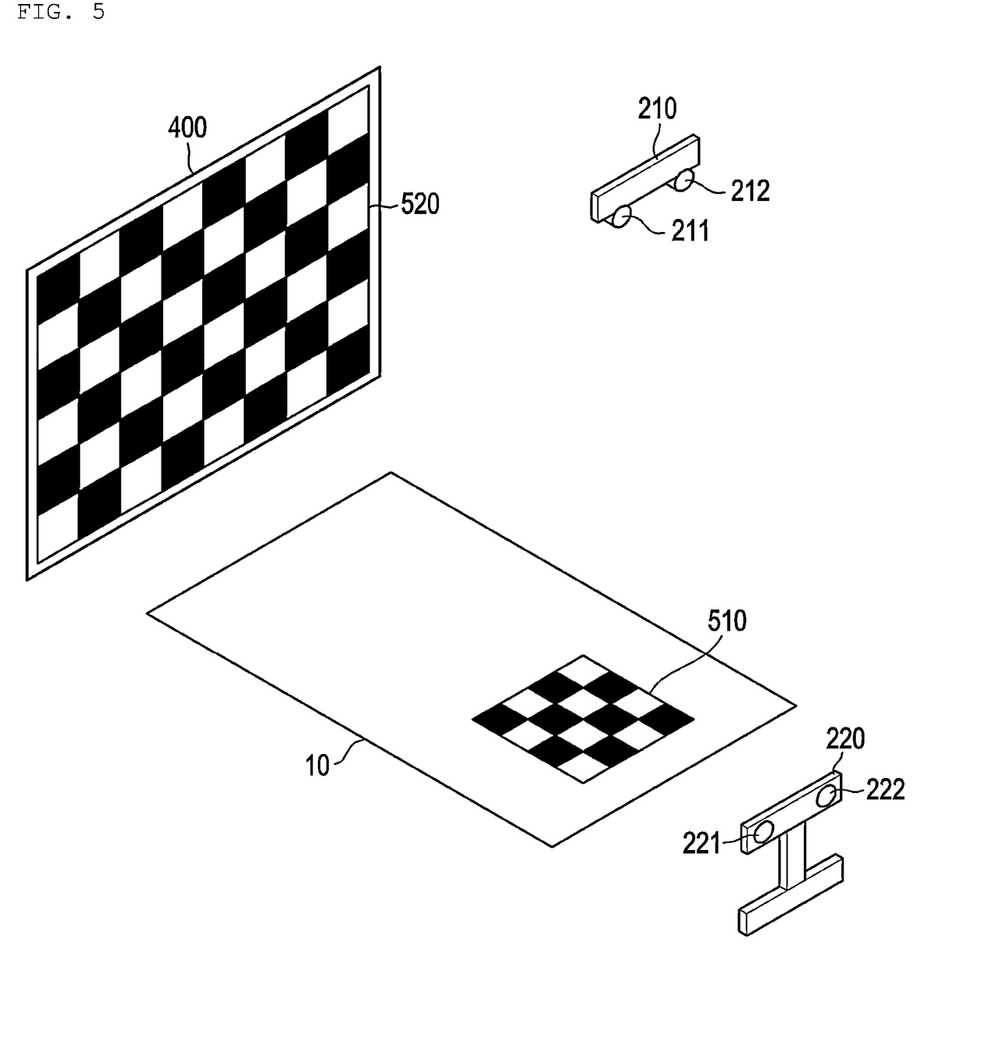
FIG. 5 illustratively shows a situation in which a virtual golf simulation is performed according to one embodiment of the invention.
Figure 6:
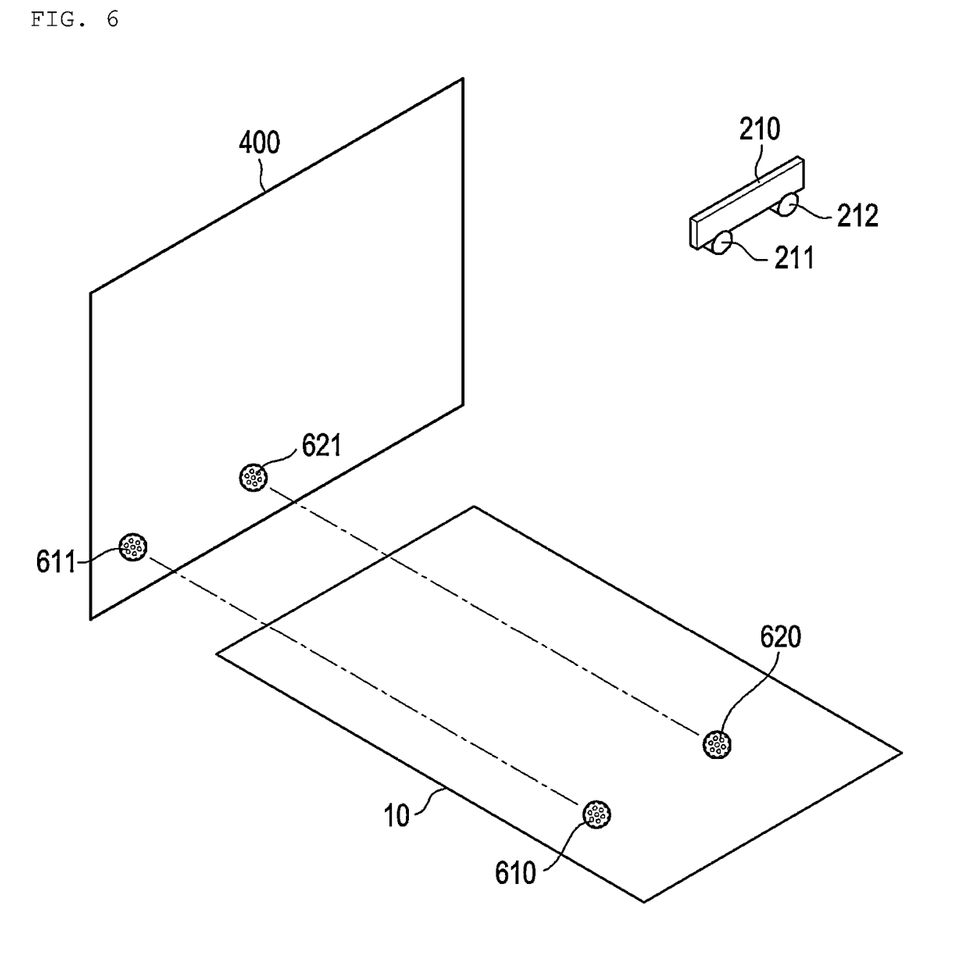
FIG. 6 illustratively shows a situation in which a virtual golf simulation is performed according to one embodiment of the invention.

FIGS. 5 and 6 illustratively show a situation in which a virtual golf simulation is performed according to one embodiment of the invention.

According to one embodiment of the invention, a situation may be assumed in which the first photographing module 210 and the second photographing module 220 comprise a plurality of cameras 211, 212, 221, and 222 (e.g., stereo cameras). Here, the first photographing module 210 may be positioned and fixed in a location to view the ground surface to photograph a golf ball, and the second photographing module 220 may be positioned and fixed in the front or side of the display unit 400 to photograph a display area of the display unit 400 where information associated with the golf ball is displayed.

First, referring to FIG. 5, a predetermined pattern (i.e., a first reference pattern) may be provided by the first reference pattern unit 510, and information on the first reference pattern (specifically, coordinates of each pattern within the first reference pattern) may be specified in an image photographed by the first photographing module 210.

Next, on the basis of the information on the first reference pattern, positioning information of the first photographing module 210 may be specified in a reference spatial coordinate system associated with the first photographing module 210 or the virtual golf simulation system (or the simulator 300).

Next, by analyzing a position and direction of the second photographing module 220 with respect to the image photographed by the first photographing module 210, positioning information of the second photographing module 220 may be specified in the reference spatial coordinate system associated with the first photographing module 210 or the virtual golf simulation system (or the simulator 300).

Meanwhile, a position of a third reference pattern (not shown) (specifically, a pattern provided by a third reference pattern unit (not shown) positioned between the second photographing module 220 and the display area to face the second photographing module 220) in the reference spatial coordinate system may be specified with respect to the image photographed by the first photographing module 210, and the positioning information of the second photographing module 220 may be specified on the basis of information on the position of the third reference pattern and information on the third reference pattern (e.g., coordinates of each pattern within the third reference pattern) specified in an image photographed by the second photographing module 220.

Next, a predetermined pattern (i.e., a second reference pattern) may be provided by the second reference pattern unit 520, and information on the second reference pattern may be specified in the image photographed by the second photographing module 220.

Next, on the basis of the information on the second reference pattern (e.g., coordinates of each pattern within the second reference pattern), a positional relationship between coordinates specified in the second photographing module 220 and coordinates specified in the display area may be determined.

Next, with reference to the positioning information of the first photographing module 210 and the second photographing module 220 and the positional relationship between the coordinates specified in the second photographing module 220 and the coordinates specified in the display area, a positional relationship between coordinates specified in the first photographing module 210 and the coordinates specified in the display area may be determined.

Next, when a golfer hits the ball, information on a trajectory of the subject in the display area of the display unit 400 may be determined on the basis of the positional relationship between the coordinates specified in the first photographing module 210 and the coordinates specified in the display area.

For example, referring to FIG. 6, according to one embodiment of the invention, a height and position 610 and 620 at which the ball moves in the real world, and a height and position 611 and 621 at which the ball moves in the display area may be provided in synchronization with each other.

Figure 7:
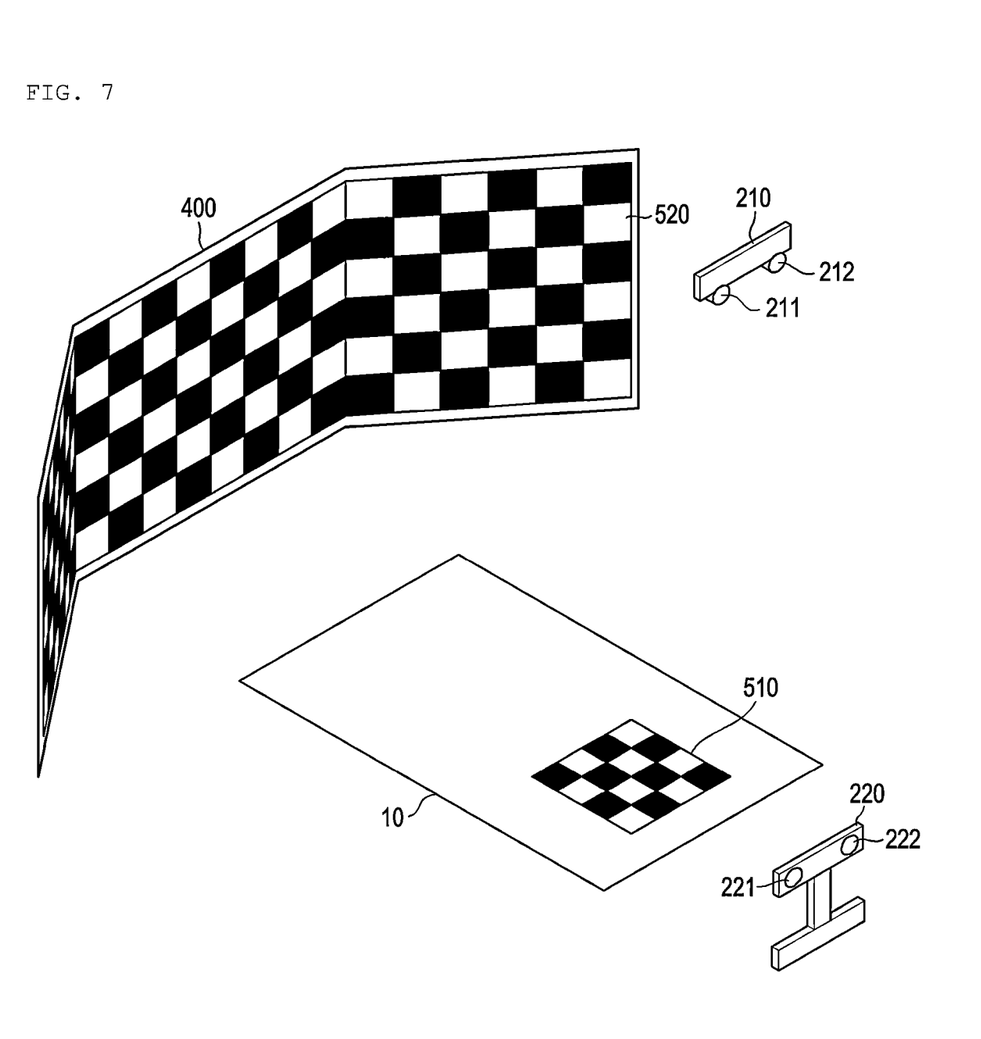
FIG. 7 illustratively shows a situation in which a virtual golf simulation is performed according to one embodiment of the invention when there are a plurality of areas where information associated with a golf ball is displayed.

FIG. 7 illustratively shows a situation in which a virtual golf simulation is performed according to one embodiment of the invention when there are a plurality of areas where information associated with a golf ball is displayed.

According to one embodiment of the invention, when there are a plurality of display areas where information associated with a golf ball is displayed (e.g., in the case of a multi-sided screen), a second reference pattern may be positioned for each of the display areas (or the entire display areas) (e.g., the same or different second reference patterns may be positioned for each display), and a positional relationship between coordinates specified in the first photographing module and coordinates specified in the display area may be determined with reference to information on each of the second reference patterns specified in an image photographed by the second photographing module 220.

Meanwhile, when the plurality of display areas are shaped in a curved surface, the positional relationship between the coordinates specified in the first photographing module and the coordinates specified in the display area may be more precisely specified by interpolating the respective coordinates corresponding to the curved surface into a curve.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method performed in a system for supporting a virtual golf simulation, the system comprising one or more processors and the method comprising the steps of:

by the one or more processors, determining, with reference to information on a first reference pattern specified in an image photographed by a first photographing module positioned to photograph a moving subject and information on a second reference pattern specified in an image photographed by a second photographing module positioned to photograph a display area where information associated with the subject is displayed, a positional relationship between coordinates specified in the first photographing module and coordinates specified in the display area; and by the one or more processors, determining information on a trajectory of the subject in the display area with reference to the positional relationship, wherein the display area is distinct from a real-world area where the subject is photographed, and wherein in the step of determining the positional relationship, a positional relationship between coordinates specified in the second photographing module and the coordinates specified in the display area is determined on the basis of a correspondence relationship between three-dimensional coordinates of each pattern within the second reference pattern specified with respect to the second photographing module and two-dimensional coordinates of each pattern within the second reference pattern specified with respect to the display area, and the positional relationship between the coordinates specified in the first photographing module and the coordinates specified in the display area is determined with further reference to the positional relationship between the coordinates specified in the second photographing module and the coordinates specified in the display area.

2. The method of claim 1, wherein the first photographing module is fixed facing a ground surface.

3. The method of claim 1, wherein the first reference pattern is a pattern positioned on a ground surface, and the second reference pattern is a pattern positioned in the display area.

4. The method of claim 1, wherein the step of determining the positional relationship between the coordinates specified in the first photographing module and the coordinates specified in the display area comprises the steps of:
   (a) specifying positioning information of the first photographing module with reference to the information on the first reference pattern, and specifying positioning information of the second photographing module with reference to information on a third reference pattern specified in the image photographed by the second photographing module;
   (b) determining a positional relationship between the first photographing module and the second photographing module with reference to the positioning information of the first photographing module and the positioning information of the second photographing module; and
   (c) determining the positional relationship between the coordinates specified in the first photographing module and the coordinates specified in the display area, with reference to the positional relationship between the first photographing module and the second photographing module, and
   wherein the third reference pattern is a pattern positioned between the second photographing module and the display area.

5. The method of claim 4, wherein the step (a) comprises the step of specifying a position of the third reference pattern with reference to the image photographed by the first photographing module.

6. The method of claim 4, wherein the first reference pattern and the third reference pattern are positioned in one assembly.

7. The method of claim 1, wherein in the step of determining the positional relationship between the coordinates specified in the first photographing module and the coordinates specified in the display area, an attribute of the second reference pattern is dynamically determined with reference to information on a resolution of the display area.

8. A non-transitory computer-readable recording medium having stored thereon a computer program for executing the method of claim 1.

9. The method of claim 1, wherein the first reference pattern is placed on a ground, and the display area is extended vertical to the ground, and
   wherein the first photographing module is positioned above the first reference pattern, and the second photographing module is configured to face the display area and photograph the second reference pattern in the display area.

10. A system for supporting a virtual golf simulation, the system comprising one or more processors configured to:
    determine, with reference to information on a first reference pattern specified in an image photographed by a first photographing module positioned to photograph a moving subject and information on a second reference pattern specified in an image photographed by a second photographing module positioned to photograph a display area where information associated with the subject is displayed, a positional relationship between coordinates specified in the first photographing module and coordinates specified in the display area; and
    determine information on a trajectory of the subject in the display area with reference to the positional relationship,
    wherein the display area is distinct from a real-world area where the subject is photographed, and
    wherein the one or more processors are configured to determine a positional relationship between coordinates specified in the second photographing module and the coordinates specified in the display area on the basis of a correspondence relationship between three-dimensional coordinates of each pattern within the second reference pattern specified with respect to the second photographing module and two-dimensional coordinates of each pattern within the second reference pattern specified with respect to the display area, and determine the positional relationship between the coordinates specified in the first photographing module and the coordinates specified in the display area with further reference to the positional relationship between the coordinates specified in the second photographing module and the coordinates specified in the display area.

11. The system of claim 10, wherein the first photographing module is fixed facing a ground surface.

12. The system of claim 10, wherein the first reference pattern is a pattern positioned on a ground surface, and the second reference pattern is a pattern positioned in the display area.

13. The system of claim 10, wherein the one or more processors are configured to:
    specify positioning information of the first photographing module with reference to the information on the first reference pattern, and specify positioning information of the second photographing module with reference to information on a third reference pattern specified in the image photographed by the second photographing module;
    determine a positional relationship between the first photographing module and the second photographing module with reference to the positioning information of the first photographing module and the positioning information of the second photographing module; and
    determine the positional relationship between the coordinates specified in the first photographing module and the coordinates specified in the display area, with reference to the positional relationship between the first photographing module and the second photographing module, and
    wherein the third reference pattern is a pattern positioned between the second photographing module and the display area.

14. The system of claim 13, wherein the one or more processors are configured to specify a position of the third reference pattern with reference to the image photographed by the first photographing module.

15. The system of claim 13, wherein the first reference pattern and the third reference pattern are positioned in one assembly.

16. The system of claim 10, wherein the one or more processors are configured to dynamically determine an attribute of the second reference pattern with reference to information on a resolution of the display area.

17. The system of claim 10, wherein the first reference pattern is placed on a ground, and the display area is extended vertical to the ground, and
    wherein the first photographing module is positioned above the first reference pattern, and the second photographing module is configured to face the display area and photograph the second reference pattern in the display area.

* * * * *